UNITED STATES PATENT OFFICE.

MELVILLE MILLINGTON SMITH, OF FREDONIA, KANSAS, ASSIGNOR TO THE FREDONIA PORTLAND CEMENT COMPANY, OF FREDONIA, KANSAS, A CORPORATION OF NEW JERSEY.

WATERPROOF CEMENT.

No. 918,384.     Specification of Letters Patent.     Patented April 13, 1909.

Application filed September 9, 1908. Serial No. 452,182.

*To all whom it may concern:*

Be it known that I, MELVILLE MILLINGTON SMITH, a citizen of the United States, and a resident of Fredonia, in the county of Wilson and State of Kansas, have made certain new and useful Improvements in Waterproof Cement, of which the following is a specification.

My invention relates to an improved process for the manufacture of white waterproof cement of a kind suitable for the making of articles of stone, or for other uses where a white waterproof cement is desirable.

The object of my invention is to provide a method by which an ordinary cement composed of varying proportions of $SiO_2$, $Al_2O_3$ and $CaO$, can be whitened and waterproofed after being burned to a clinker.

The use of the above ingredients for the making of cement is common, but the addition of a mixture for whitening and waterproofing the ordinary white cement, as outlined in the following process, is, as I believe, new.

My invention consists in calcining in rotary kilns, or in upright kilns, an intimate mixture of limestone, fire-clay and kaolin, or a mixture of limestone and feldspathic clay, the materials being practically free of iron. The burning is continued almost up to the point of fusion, that is to say, beyond the sintering limit. The mixture is to be made according to the proportions $xSiO_2 + yAl_2O_3 = CaO$, in which $x = 2.5$ to $2.7$ and $y$ $1$ to $1.1$. The combination of the $SiO_2$, $Al_2O_3$ and $CaO$ is brought about by any one of the following fluxes:—halite (NaCl) sodium carbonate, $(Na_2CO_3)$ orthoclase, $(KAlSi_3O_8)$ albite, $(NaAlSi_3O_8)$, soda niter $(NaNO_3)$.

The use of any of the above fluxes as an ingredient of cement, promotes the combination of the artificially prepared mixture of $SiO_2$, $Al_2O_3$, and $CaO$, to form white Portland cement.

After the mass has been well calcined, the clinker therefrom is treated with the following mixture, to wit: a 40 to 80% $SiO_2$ and a 20 to 40% $Al_2O_3$, the latter being preferably in the form of kaolin. The mixture of the clinker and the $SiO_2$ and the $Al_2O_3$ is then passed through the finishing mills, such as tube mills, Griffin mills, Kent mills, &c., and thoroughly ground together. This mixture of the $SiO_2$ and the $Al_2O_3$ with the clinker has the effect of whitening the resulting finely ground product, and gives it waterproofing qualities of a lasting character.

I claim—

The herein described process of making white waterproof cement, which consists in the admixture of lime and clay as free as possible from iron, together with a flux, burning the resulting mass to the verge of fusion, that is to say, beyond the sintering limit, and grinding the resulting clinker with a mixture of clay free from iron.

MELVILLE MILLINGTON SMITH.

Witnesses:
ED CHAPMAN,
H. R. JOY.